United States Patent
Fisi et al.

(10) Patent No.: US 11,538,041 B1
(45) Date of Patent: *Dec. 27, 2022

(54) SECONDARY FINANCIAL SESSION MONITORING ACROSS MULTIPLE ACCESS CHANNELS

(71) Applicant: Wells Fargo Bank, N.A., San Francisco, CA (US)

(72) Inventors: Suzanne M. Fisi, Clayton, CA (US); Kristine Ing Kushner, Orinda, CA (US); Stephanie S. Hellman, Fairfax, CA (US); Joel Gardner, San Francisco, CA (US); John Chuprevich, Davidson, NC (US); Ayesha Hasan, San Francisco, CA (US); Darrell L. Suen, San Ramon, CA (US); Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 17/245,673

(22) Filed: Apr. 30, 2021

Related U.S. Application Data

(63) Continuation of application No. 16/885,945, filed on May 28, 2020, now Pat. No. 11,030,625, which is a
(Continued)

(51) Int. Cl.
*G06Q 20/40* (2012.01)
*G06Q 40/02* (2012.01)

(52) U.S. Cl.
CPC ....... *G06Q 20/4016* (2013.01); *G06Q 20/407* (2013.01); *G06Q 40/02* (2013.01)

(58) Field of Classification Search
CPC ... G06Q 20/4016; G06Q 20/407; G06Q 40/02
See application file for complete search history.

(56) References Cited

U.S. PATENT DOCUMENTS

| 8,082,349 B1 | 12/2011 | Bhargava et al. |
| 8,145,560 B2 | 3/2012 | Kulkarni et al. |

(Continued)

FOREIGN PATENT DOCUMENTS

| JP | 2005244964 A | * | 9/2005 |
| JP | 2005244964 A | | 9/2005 |

(Continued)

OTHER PUBLICATIONS

"NEC Corporation; Patent Issued for Subscriber Accommodating Apparatus, Transfer Control Method, Communication System, and Program Product." China Weekly News, Apr. 23, 2013. http://dialog.proquest.com/professional/docview/1328128659?accountid=131444. (Year: 2013).*

(Continued)

*Primary Examiner* — Scott C Anderson
*Assistant Examiner* — James H Miller
(74) *Attorney, Agent, or Firm* — Merchant & Gould P.C.

(57) ABSTRACT

An example computing device is programmed to: (a) detect an attempt to secondarily access a user account, the user account being involved in an ongoing primary financial session with a primary device; (b) raise the level of authentication required to secondarily access the user account beyond that which was required to access the account for the primary financial session; (c) when successful authentication at the raised level is achieved, permit secondary access to the user account through a secondary financial session and compare one or more user activities occurring during the secondary financial session to a plurality of fraud profiles; and (d) indicate fraud when comparison of the user activity is consistent with one or more of the plurality of fraud profiles.

20 Claims, 10 Drawing Sheets

Related U.S. Application Data continuation of application No. 15/393,462, filed on Dec. 29, 2016, now Pat. No. 10,719,830.

(56) References Cited

U.S. PATENT DOCUMENTS

| | | | |
|---|---|---|---|
| 8,280,833 B2 | 10/2012 | Miltonberger | |
| 8,296,205 B2 | 10/2012 | Zoldi | |
| 8,606,712 B2 | 12/2013 | Choudhuri et al. | |
| 8,666,841 B1 | 3/2014 | Claridge et al. | |
| 8,826,371 B2 | 9/2014 | Webb et al. | |
| 9,111,278 B1 | 8/2015 | Barton et al. | |
| 9,185,101 B2 | 11/2015 | Grigg et al. | |
| 9,203,860 B1 | 12/2015 | Casillas et al. | |
| 9,300,676 B2 | 3/2016 | Madhu et al. | |
| 10,572,949 B1* | 2/2020 | Bueche, Jr. | G06Q 10/10 |
| 10,719,830 B1* | 7/2020 | Fisi | G06Q 20/401 |
| 2004/0073512 A1* | 4/2004 | Maung | H04L 63/068 705/51 |
| 2008/0114885 A1* | 5/2008 | Kulkarni | H04L 67/1001 709/229 |
| 2008/0134317 A1 | 6/2008 | Boss et al. | |
| 2008/0168538 A1* | 7/2008 | Yan | H04L 63/083 726/4 |
| 2009/0265464 A1* | 10/2009 | Jakobson | G06F 21/554 709/224 |
| 2012/0239557 A1 | 9/2012 | Weinflash et al. | |
| 2012/0297446 A1* | 11/2012 | Webb | G06Q 20/4014 726/1 |
| 2014/0000009 A1 | 1/2014 | Marvald | |
| 2014/0164178 A1 | 6/2014 | Adjaoute | |
| 2014/0173707 A1* | 6/2014 | Hollander | H04L 63/10 726/7 |
| 2014/0222631 A1 | 8/2014 | Love et al. | |
| 2015/0026351 A1* | 1/2015 | Calman | H04L 65/1083 709/227 |
| 2015/0066772 A1 | 3/2015 | Griffin et al. | |
| 2016/0048846 A1 | 2/2016 | Douglas et al. | |
| 2018/0077243 A1* | 3/2018 | Mathew | H04L 67/143 |
| 2020/0092291 A1* | 3/2020 | Vempati | H04L 63/102 |
| 2021/0329030 A1* | 10/2021 | Kedem | H04L 63/1425 |

FOREIGN PATENT DOCUMENTS

| | | | | |
|---|---|---|---|---|
| JP | 4954979 B2 * | 6/2012 | | G06F 21/316 |
| WO | 2016025944 A1 | 2/2016 | | |
| WO | 2017074822 A1 | 5/2017 | | |
| WO | WO-2017074822 A1 * | 5/2017 | | H04L 63/06 |

OTHER PUBLICATIONS

CA RiskMinder, Data Sheet, CA Technologies, http://www.ca.com/us/~/media/Files/ProductBriefs/CA-RiskMinder-product-brief-key-features.pdf, 2 pages (Copyright 2013).

Chessell et al., "Smarter Analytics: Driving Customer Interactions with the IBM Next Best Action Solution," IBM, http://www.redbooks.ibm.com/redpapers/pdfs/redp4888.pdf, pp. 1-36 (Aug. 28, 2013).

FS Viewpoint, Let's make a difference: Managing compliance and operational risk in the new environment, PricewaterhouseCoopers LLP, https://www.pwc.com/us/en/financial-services/publications/viewpoints/assets/pwc-compliance-operational-risk-management.pdf, pp. 1-24 (Aug. 2013).

Identifying Fraud, Managing Risk and Improving Compliance in Financial Services, Cloudera, Inc., https://www.cloudera.com/content/dam/cloudera/Resources/PDF/solution-briefs/Cloudera_Solution_Brief_Datameer_Identifying_Fraud_Managing_Risk_and_Improving_Compliance_in_Financial_Services.pdf, pp. 1-6 (Copyright 2013).

Kim et al., "A Method of Risk Assessment for Multi-Factor Authentication," Journal of Information Processing Systems, vol. 7, No. 1, pp. 187-198 (Mar. 2011).

Koved, L. "Usable Multi-Factor Authentication and Risk-Based Authorization," IBM, http://www.redbooks.ibm.com/redpapers/pdfs/redp4888.pdf, pp. 1-12 (Sep. 12, 2013).

Risk-based authentication (Vasco RBA), Vasco, https://www.vasco.com/images/Risk%20Based%20Authentication_US_201409_tcm42-47655.pdf, 2 pages (Copyright 2014).

RSA Risk Engine, EMC2, http://germany.emc.com/collateral/hardware/h9096-rsa-risk-engine-sb-11-2.pdf, 6 pages (Copyright 2012).

* cited by examiner

| | Device Categories | |
|---|---|---|
| Cat. 1: | Mobile Browser Device | |
| Cat. 2: | Web Browser Device | |
| Cat. 3: | Dial-In Device | |
| Cat. 4: | ATM OS Device | |

410a, 410b, 410c, 410d

| First Level Authentication |
|---|
| Username/Password |
| Telephone No./PIN |
| Identification No./PIN |

412a, 412b, 412c

| User Activities |
|---|
| Monetary Withdrawal |
| Monetary Deposit |
| Monetary Trans. – Int. User Acct. |
| Monetary Trans. – Int. Non-User Acct. |
| Monetary Trans. – External Acct. |
| Loan Request |
| Check Printing Request |
| New Debit/Credit Card Request |
| Re-Issue of Debit/Credit Card Req. |
| Open New Monetary Account Req. |
| Insurance Request |
| Change of Personal Information |

Banking Session History

| | | | | | | | | | | |
|---|---|---|---|---|---|---|---|---|---|---|
| 502a | Session ID: | \multicolumn{4}{c}{A-11-17-16-01  504a} | | \multicolumn{5}{c}{A-11-17-16-02  506a} |
| 502b | Detected Device Type: | Web Browser Device  504b | | | | | Dial-In Device  506b | | | |
| 502c | Authentication Level I – Type / Successful? | Username / Password  504c(i) | | Y  504c(ii) | | | Telephone No. / PIN  506c(i) | | Y  506c(ii) | | |
| 502d | Authentication Level II Type / Successful? | | | | | | Knowledge  506d(i) | | Y  506d(ii) | | |
| 502e | Authentication Level III Type / Successful? | | | | | | E-Mail Message  506e(i) | | Y  506e(ii) | | |
| 502f | Session Date | November 17, 2016  504f | | | | | November 17, 2016 | | | | |
| 502g | Session Start Time | 13:07  504g | | | | | 13:11 | | | | |
| 502h | User Activity 1 / Time / Amount / External I.D. / Successful: | Monetary Trans – Int. User Acct. 504h(i) | 13:10 (ii) | $800 (iii) | N/A (iv) | Y (v) | Monetary Trans. – External Acct. 506h(i) | 13:14 (ii) | $6000 (iii) | Bank of Fiji (iv) | N (v) |
| 502i | User Activity 2 / Time / Amount / External I.D. / Successful: | Check Printing Request 504i(i) | 13:14 (ii) | $25 (iii) | N/A (iv) | Y (v) | | | | | |
| 502j | User Activity 3 / Time / Amount / External I.D. / Successful: | | | | | | | | | | |
| 502k | | | | | | | | | | | |
| 502l | Logout – Session End Time | 13:20  504k | | | | | | | | | |
| 502m | Secondary Session? Y/N | Y  504l | | | | | N  506l | | | | |
| 502n | Secondary Session ID: | A-11-17-16-02  504m | | | | | | | | | |
| | Termination Time | | | | | | 13:15  506n | | | | |

*FIG. 5*

Secondary Session Account Owner Preferences 700

| | 702 | 704 | |
|---|---|---|---|
| a | Allow Secondary Session From Different Type of Device | YES | a |
| b | Allow Secondary Session from Same Type of Device | NO | b |
| c | Second Level Authentication Type Preference | Physical Characteristic | c |
| d | Number of Attempts Allowed at Second Level Authentication | 2 | d |
| e | Require Additional Third Level Authentication | NO | e |
| f | Third Level Authentication Type Preference | N/A | f |
| g | Number of Attempts Allowed at Third Level Authentication | N/A | g |
| h | Failure of Authentication – Termination Preference | Term – Secondary Only | h |
| i | Send Primary Device Notification of Secondary Session Attempt | YES | i |
| j | Send Primary Device Notification of Secondary Session Authentication Success | YES | j |
| k | Send Primary Device Notification of Secondary Session Authentication Failure | YES | k |
| l | Send Primary Device Notification of Secondary Session Fraud Indication | YES | l |
| m | Fraud Indication in Secondary Session – Termination Preference | Term – Primary & Secondary | m |

*FIG. 7*

| FRAUD PROFILES – USER SECONDARY SESSION HISTORY | |
|---|---|
| No previous attempt at secondary session | 806a |
| Detected device not previously used for secondary session | 806b |
| Combination of detector primary and secondary devices not previously used | 806c |
| No attempts at current activity in previous secondary sessions | 806d |
| Concurrent session activities exceeds average number of previous secondary session activities (or user defined maximum of activities) | 806e |
| No previous monetary transfer between internal and external accounts | 806f |
| Payment into / withdrawal from current account by previously unused external source | 806g |
| Transfers between internal accounts exceeds previous and/or user defined maximums | 806h |
| Transfers between internal and external accounts exceeds previous and/or user defined maximums | 806i |

806

| FRAUD PROFILES – SECONDARY SESSION MULTIPLE SOURCE DATA | |
|---|---|
| Attempt to Change Personal User Information:<br>• User Address<br>• User Phone Number<br>• User Social Security Number<br>• User Password<br>• User E-Mail Address<br>• User Text Address | 808a |
| Activity Involving Large Monetary Value | 808b |
| Activity Originating or Transferring Outside of Home Country | 808c |
| User Device Type Same as Primary Device Type | 808d |
| Same Type of Activity as Performed in Primary Banking Session | 808e |

SECONDARY FINANCIAL SESSION MONITORING ACROSS MULTIPLE ACCESS CHANNELS

BACKGROUND

The state of technology today allows numerous channels of access to a financial account and further allows access to the financial account by more than one device at the same time (concurrent) as another device or within minutes (proximate) of another device. The channels of access are provided through various devices which can include home and work computers, smart devices such as smart phones, tablets and watches, as well as standard telephones and automatic teller machines (ATMs). With a greater number of channels comes a greater possibility for fraud, especially during concurrent or proximate secondary access to the user financial account.

SUMMARY

A system and method of monitoring concurrent or proximate secondary financial sessions across multiple access channels are described herein.

One aspect of the present disclosure is directed to non-transitory computer-readable medium storing data instructions which, when executed by a processor, cause the processor to: (a) detect an attempt to secondarily access a user account, the user account associated with a plurality of account owner settings and the user account being involved in an ongoing primary financial session with a primary device; (b) raise the level of authentication required to secondarily access the user account beyond that which was required to access the account for the primary financial session; (c) when successful authentication at the raised level is achieved, permit secondary access to the user account through a secondary financial session and compare one or more user activities occurring during the secondary financial session to a plurality of fraud profiles; and (d) indicate fraud when comparison of the user activity is consistent with one or more of the plurality of fraud profiles.

Another aspect of the present disclosure is directed to a system that includes a processor, a non-transitory computer-readable medium storing data instructions that are executable by the processor, and a display device communicatively coupled to the processor. Upon the processor executing the data instructions, the processor is caused to: (a) detect an attempt to secondarily access a user account, the user account associated with a plurality of account owner settings and the user account being involved in an ongoing primary financial session with a primary device; (b) raise the level of authentication required to secondarily access the user account beyond that which was required to access the account for the primary financial session; (c) when successful authentication at the raised level is achieved, permit secondary access to the user account through a secondary financial session and compare one or more user activities occurring during the secondary financial session to a plurality of fraud profiles; and (d) indicate fraud when comparison of the user activity is consistent with one or more of the plurality of fraud profiles. The display device is configured to display both primary financial session history and secondary financial session history.

Still another aspect of the present disclosure is directed to a method. The method comprises: (a) monitoring a user financial account involved in a primary financial session for an attempt of secondary access to the user financial account; (b) raising a level of authentication for secondary access to the user financial account; (c) when authentication as the raised level is achieved, allowing secondary access to the user financial account through a secondary financial session; (d) comparing one or more user activities during the secondary financial session against a plurality of fraud profiles and indicating fraud at least one of the user activities is consistent at least one of the plurality of fraud profiles; and (e) terminating or offering to terminate the secondary financial session based on the indication of fraud.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

FIG. 4B illustrates lists of Device Categories, First Level Authentication and User Activities referenced in the flowchart of FIG. 4A.

FIG. 5 is an illustration of an example graphical user interface showing a data record of the data tracking module of the financial institution of FIG. 1.

FIG. 7 is an illustration of an example of a graphic user interface of a data record of an account owner preference module of the financial institution of FIG. 1.

FIG. 8B illustrates lists of Fraud Profiles referenced in the flowchart of FIG. 8A.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
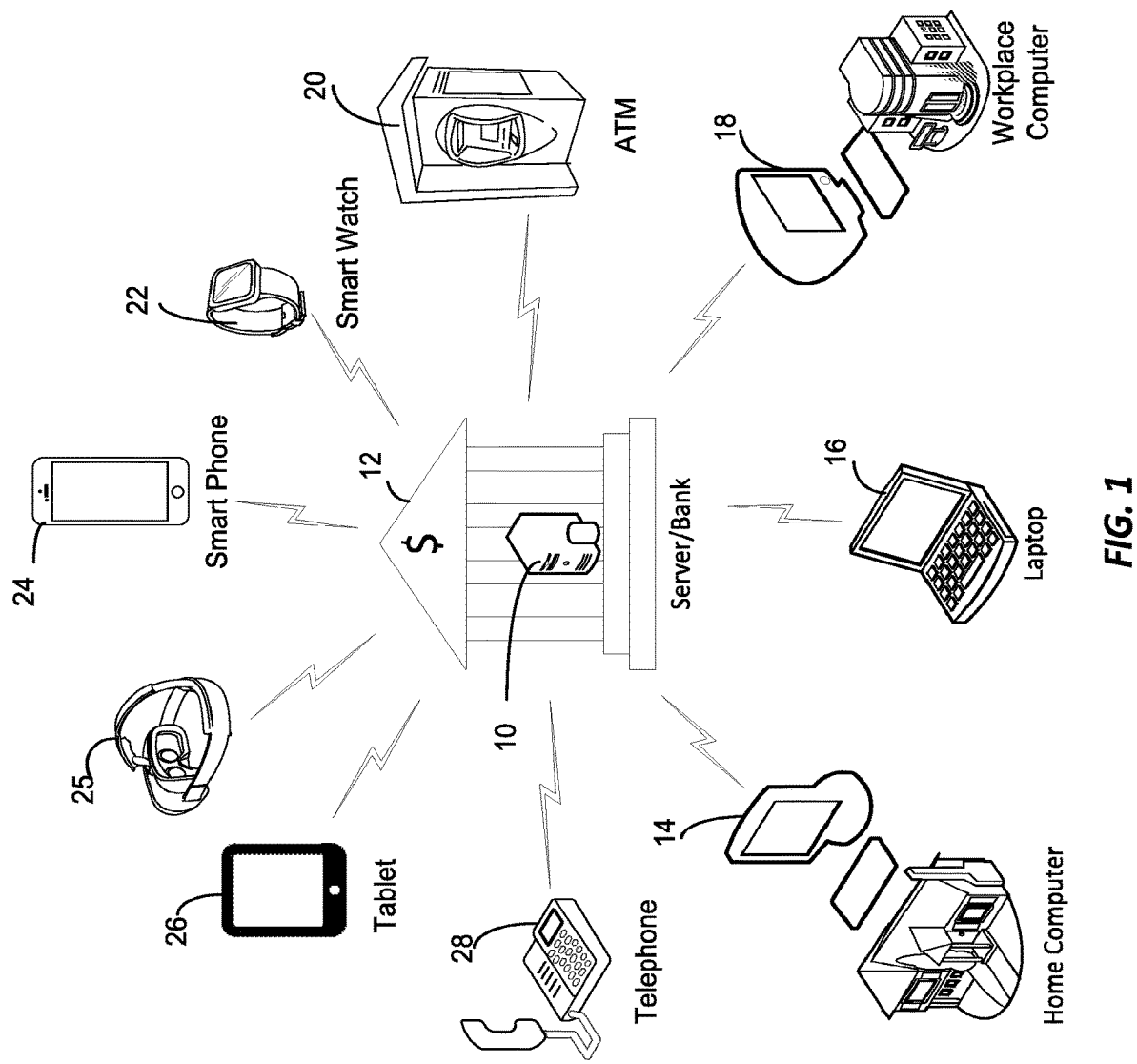
FIG. 1 is a schematic view illustrating a system including multiple channels of user access to resources of a financial institution.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes,"

and "including" are interchangeable and not intended to be limiting. The term "such as" also is not intended to be limiting. For example, the term "including" shall mean "including, but not limited to."

A system and method for the monitoring of secondary financial sessions, which occur concurrent with or proximate to primary financial sessions, across multiple access channels are described herein. A primary financial session in a user account, or primary access to a user account, is deemed to occur when no other device is involved in an ongoing financial session with the user account or when no other device has recently been involved (e.g. within the last five minutes) in a financial session with the user account. A concurrent secondary financial session in a user account, or concurrent secondary access to a user account, is deemed to occur when a first device is involved in an ongoing primary financial session with the user account when a second device attempts to access the same user account. A proximate secondary financial session in a user account, or proximate secondary access to a user account, is deemed to occur when a first device has completed a primary financial session with the user account within a recent amount of time (e.g., within five minutes, which can be further broken down into time classifications, e.g. within one second=close proximate, within one minute=medium proximate, within five minutes=long proximate) when a second device attempts to access the same user account.

The system and method include software and hardware enabling detection of concurrent and/or proximate secondary access to a user account. In detecting the secondary access to the user account, the system and method are able raise authentication levels required for secondary access to the user account in accordance with account owner preference. Further, if authentication for secondary access is successful, the system and method are able to monitor and analyze user activities occurring during the secondary financial session to determine the presence or possibility of fraud in the activity, and, subsequently, terminate or otherwise deal with the fraud according to account owner preference.

FIG. 1 is a schematic illustrating just some of the varied, multiple channels of access that a user may utilize to access the servers 10 of their associated financial system 12. These channels of access include, but are not limited to, access from a home computer 14, laptop 16 or workplace computer 18 via wired/fiber optic or wireless communication. The channels of access further include automatic teller machine (ATM) 20 access through wired/fiber optic or wireless communication. Still further channels of access include access by a mobile device such as a smart watch 22, smart phone 24 or tablet 26 via wired/fiber optic or wireless communication. And, even though technology continues to advance, many users still have access to the servers 10 of their financial system 12 through use of a telephone 28 via analog POTS (plain old telephone service) communication. Digital telephone communication, e.g., ISDN (integrated services digital network), FDDI (fiber distributed data interface), etc., is also possible.

Figure 2:
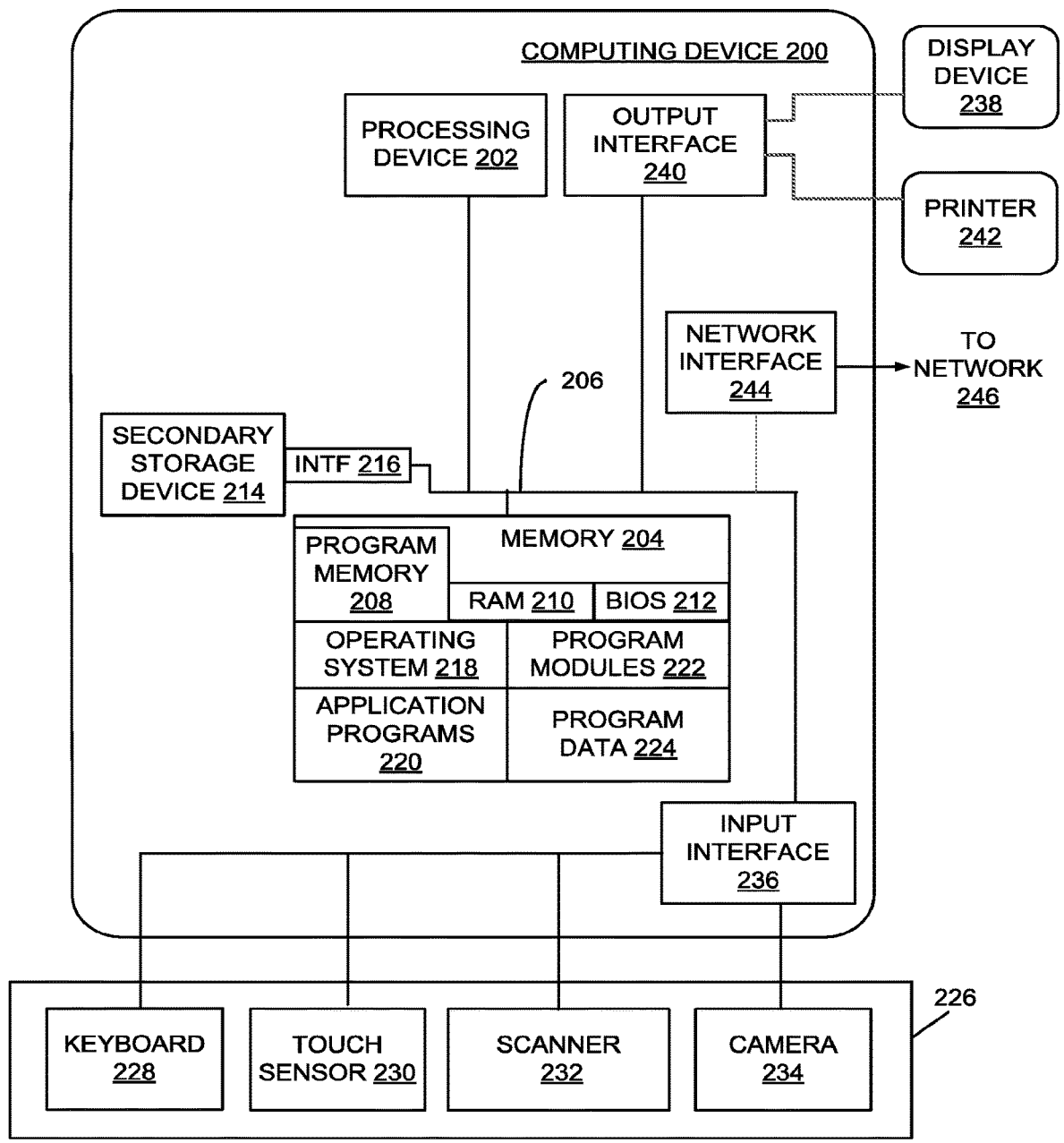
FIG. 2 is a schematic view of an exemplary computing device of the system of FIG. 1.

FIG. 2 illustrates an exemplary architecture of the server 10. Although the server 10 is depicted, aspects of the present disclosure are also applicable to the various computers 14, 16, 18, ATM 20, smart devices, e.g., devices 22, 24, 25, 26. The server 10 is one or more computing devices that can take any suitable form including those previously mentioned, e.g., a computer, a smart device, a server, as well as a microcontroller, a microprocessor or other device configured to process digital instructions.

Accordingly, to avoid undue repetition, this description of the server 10 will not be separately repeated herein for each of the noted devices. Rather, it is understood that the exemplary server 10 may be configured specific to its intended use incorporating various peripherals and programming instructions, as described herein, to achieve desired operations. Further, it is understood that the server 10 is an example of programmable electronics, which may include one or more such computing devices, and when multiple computing devices are include such computing devices can be coupled together with a suitable data communication network so as to collectively perform that various functions, methods, and operations disclosed herein.

In general terms, the server 10 includes at least one processing device (processor) and at least one computer readable storage device (non-transitory computer-readable medium). The processing device operates to execute data instructions stored in the computer readable storage device to perform various operations, methods or functions described herein.

In more particular terms, and with reference to FIG. 2, the server 10 includes at least one processing device 202 such as a central processing unit (CPU), as a well as a system memory 204 and a system bus 206. The system bus 206 couples various system components including the system memory 204 to the processing device 202. The system bus is one of any number of types of bus structures including a memory bus, a peripheral bus, and a local bus using any variety of bus architectures.

The system memory 204 includes program memory 208 and random access memory (RAM) 210. A basic input/output system (BIOS) 212 containing the basic routines that act to transfer information within the server 10, such as during start up, is typically stored in the program memory 208. In some embodiments, the server 10 also includes a secondary storage device 214, such as a hard disk drive or file server for storing digital data. The secondary storage device 214 is connected to the system bus 206 by a secondary storage interface (NTF) 216. The secondary storage device 214, and its associated computer readable media, provides nonvolatile storage of computer readable instructions (including application programs and program modules), data structures, and other data for the server 10.

Although the exemplary server 10 described herein employs a secondary storage device 214, in some embodiments the secondary storage device is eliminated or its hard disk drive/file server configuration is replaced with an alternative form of computer readable storage media. Alternative forms of computer readable storage media include, but are not limited to, magnetic cassettes, flash memory cards, digital video disks, Bernoulli cartridges, compact disk memories, digital versatile disk memories and random access memories. Some embodiments of the second storage devices 214 include non-transitory media. Further, the computer readable storage media can include local storage or cloud-based storage.

A number of program modules can be stored in the memory, or the secondary storage device 214. These program modules include an operating system 218, one or more application programs 220, other program modules 222 as described herein, and program data 224. The server 10 can utilize any suitable operating system such as Microsoft Windows, Google Chrome, Apple OS, and any other operating system suitable for a computing device.

The server 10 typically includes at least some form of computer readable media, e.g., computer readable media within the memory 204 or secondary storage device 214.

Computer readable media includes any available media that can be accessed by the server 10. By way of example, computer readable media includes computer readable storage media and computer readable communication media.

Computer readable storage media includes volatile and nonvolatile, removable and non-removable media implemented in any device configured to store information such as computer readable storage instructions, data structures, program modules or other data. Computer readable storage media includes, but is not limited to, random access memory, read only memory, electrically erasable programmable read only memory, flash memory, or other memory technology, compact disk read only memory, digital versatile disks or other optical storage, magnetic cassettes, magnetic tape, magnetic disk storage or other magnetic storage devices, or any other medium that can be used to store the desired information and that can be accessed by the server 10.

In some embodiments, a user provides inputs to the server 10 through one or more input devices 226. Examples of input devices include a keyboard 228, a touch sensor 230 (such as a touchpad or touch sensitive display), a scanner 232 and a camera 234. Other embodiments include other input devices 226 necessary for fulfilling the operations of the server 10, see FIG. 1. In some embodiments, the input devices are incorporated into the server 10. In some embodiments, the input devices are external to the server 10 and are connected to the processing device 202 through an input interface 236 that is coupled to the system bus 206. The input devices can be connected by any number of input/output interfaces such as a parallel port, a serial port, a game port, a universal serial bus, or a custom interface. Wireless communication between input device and the input interface 236 is possible as well, and includes infrared, Bluetooth wireless technology, 802.11/a/b/g/n, cellular or other radio frequency communication systems in some possible embodiments.

In the example embodiment of FIG. 2, the server 10 incorporates within or is operably coupled to a display device 238. Examples of the display device 238 include a monitor, a liquid crystal display device, a projector, or a touch sensitive display device. The display device 238 is also connected to the system bus via an output interface 240, such as a display controller. In addition to the display device 238, the server 10 can control via output interface 240 various other peripherals such as a printing device 242 or speaker (not shown). As with the input interface 236, the output interface 240 can comprise any number of input/output interfaces such as those described in the paragraph above.

The server 10 further includes a network interface 244 that includes a network communication device to communicate digital data across a data communication network 246. An example of the network interface 244 includes a wireless transceiver for transmitting digital data over a wireless network. The wireless transceiver is configured to work with one or more wireless communication technologies such as cellular communication, Wi-Fi communication (such as that conforming to one of the IEEE802.11 family of communication protocols), Bluetooth communication, and the like. In other embodiments, the network interface 244 is an Ethernet network interface device having an Ethernet port for receiving an Ethernet cable to transmit and receive digital data across the Ethernet cable to a network 246 such as a local area network of the Internet.

Figure 3:
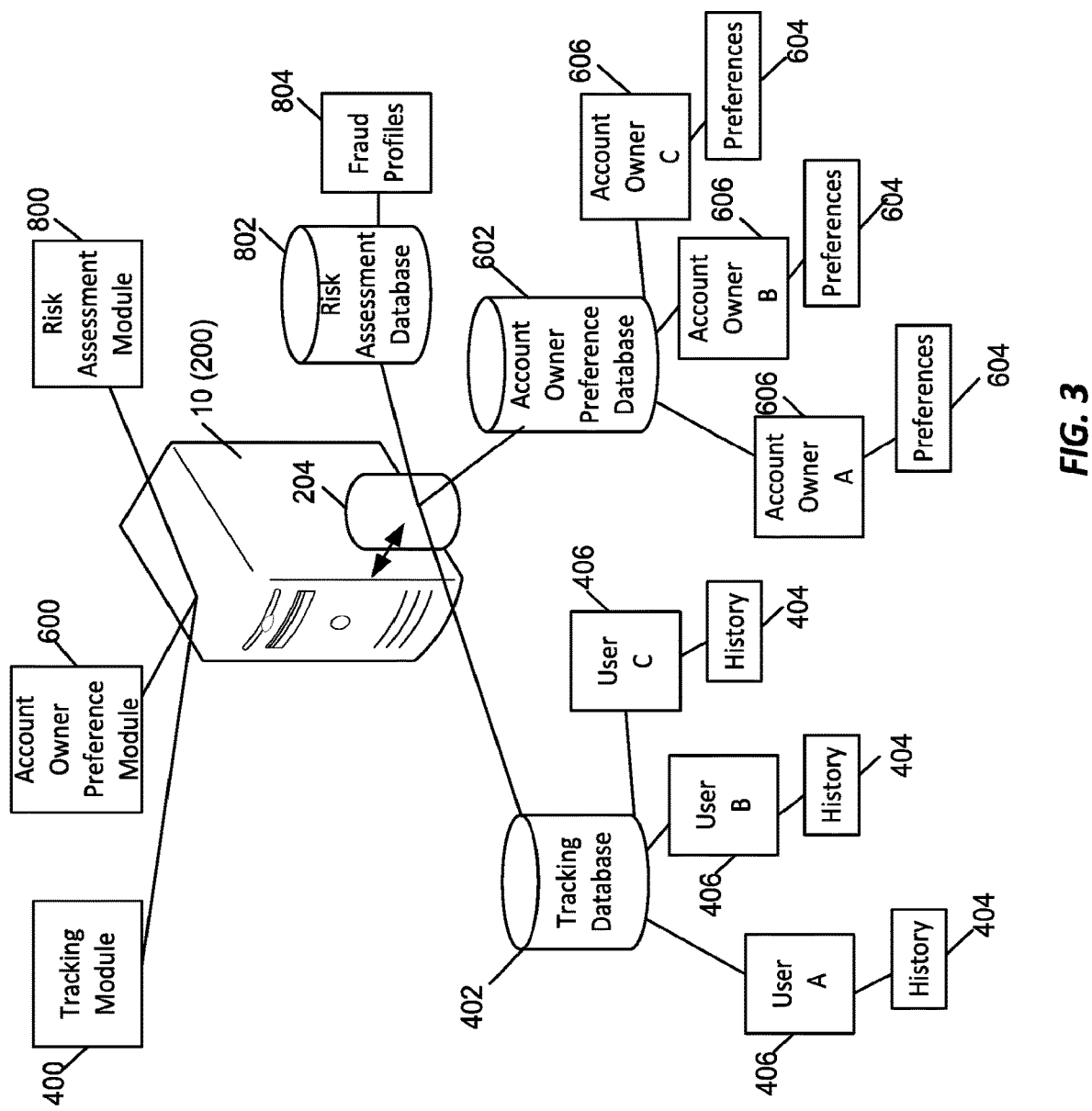
FIG. 3 is schematic view of modules and databases of the financial institution of FIG. 1.

Referring to FIG. 3, when configured for operation as the server 10, the one or more computing devices that comprise the server 10 include various program modules and memory, such as tracking module 400 and tracking database 402 to establish a financial session history 404 for each financial account owner 406 in accordance with the flowchart of FIG. 4. Further, the server 10 includes an account owner preference module 600 and account owner preference database 602 to establish secondary session preferences 604 for each financial account owner 606 in accordance with the account owner settings 608 and account owner options 610 of FIG. 6. The server 10 additionally includes a risk assessment module 800 and a risk assessment database 802 containing fraud profiles 804, which can be used to analyze user activities to detect the presence or possibility of fraud.

Figure 4A:
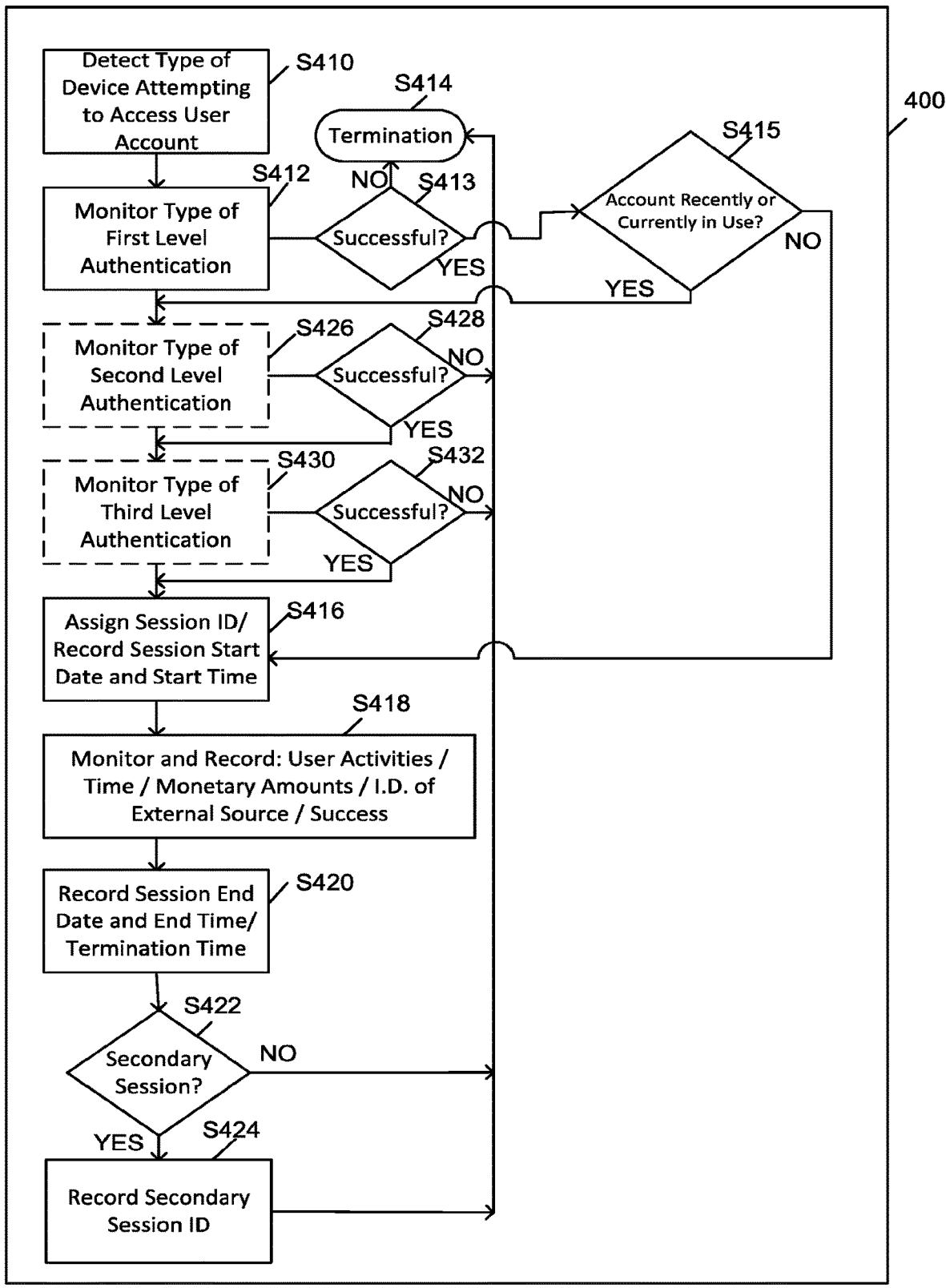
FIG. 4A is a flowchart illustrating an example of an operation of a tracking module of the financial institution of FIG. 1.

Referring to FIGS. 4A and 4B, the tracking module 400 of the server 10 generally operates, in conjunction with a tracking database 402, to track the history of each user's successful authentication to his/her respective financial user account. In addition to the tracking features described below, the tracking database 402 additionally stores the account owner address, phone number, social security number, first level authentication password, e-mail address and/or text message address. As shown, the tracking module 400 operates to detect the type of device attempting to access the user account from across multiple access channels [S410].

The types of devices, and their related access channels, may generally be divided into four categories, see FIG. 4B: (1) devices attempting to access a user account through a mobile web browser (e.g., a smart watch 22, smart phone 24, augmented reality glasses 25, tablet 26, see FIG. 1) 410*a*; (2) devices attempting to access a user account through a computer web browser (e.g., home computer 14, laptop 16, workplace computer 18, see FIG. 1) 410*b*; (3) devices attempting to access a user account through a dial-in user interface (e.g., telephone 28 or smart phone 24, see FIGS. 1) 410*c*; and (4) devices attempting to access a user account through an ATM operating system interface (e.g., ATM 20, see FIG. 1) 410*d*.

Upon detection of the type of device attempting access to a user account, the tracking module 400 operates to monitor the type of first level authentication offered to the user and whether the first level of authentication is successfully completed, [S412]. In certain example embodiments, the type of first level authentication is automatically established according to the type of device attempting to access the user account.

For example, in the instance of category (1) and category (2) devices, which are attempting to access the user account through a web-browser, the type of first level authentication comprises a username/password authentication 412*a*, wherein the user types or verbalizes a username and corresponding password for matching to those stored in server memory; match of username and password results in successful user authentication and access to the services provided by the financial institution.

In the instance of a category (3) device, the type of first level identification comprises a telephone number/PIN (personal identification number) authentication 412*b*, wherein the financial server recognizes the dial-in number and requires the user to type or verbalize their PIN through the device; matching of the dial-in number and PIN to those stored in memory results in successful user authentication and access to the services provided by the financial institution.

In the instance of a category (4) device, the type of first level identification comprises an identification number/PIN authentication 412*c*, wherein the financial server recognizes the identification number (e.g., a debit/credit card number or account number) and requires the user to type or verbalize their PIN through the device; matching of the identification number and PIN to those stored in memory results in successful user authentication and access to the services provided by the financial institution. In certain examples, a password is used in place of the PIN. Unsuccessful first level authentication [S413:NO] results in termination of operation of the tracking module, [S414].

Upon successful completion of the first level authentication to the user account [S413:YES], the tracking module 400 operates to determine whether another device was recently (e.g., within the last five minutes) or is currently involved in an ongoing financial session with the same user account [S415]. If no other device was recently or is currently involved in an ongoing financial session [S415: NO], the current device is deemed a primary device and the current session is deemed a primary financial session. The tracking module 400 then operates to assign an identifier to the session as well as to record the date and start time of the session [S416]. The tracking module 400 further operates to monitor and record user activities including the order and/or time in which they occur during the ongoing session as well as the monetary amounts involved, if any [S418].

The various user activities that can occur during a financial session include, but are not limited to (see FIG. 4B): (a) monetary withdrawals 418a; (b) monetary deposits 418b; (c) monetary transfer to internal user account 418c; (d) monetary transfer to internal non-user account 418d; (e) monetary transfer to external account 418e; (f) loan request 418f; (g) check printing request 418g; (h) new credit/debit card request 418h; (i) re-issue of existing debit/credit card request 418i; (j) open new monetary account request 418j; (k) insurance request 418k; and (1) change of personal information, e.g., change in account owner address, phone number, social security number, first level authentication password, e-mail address and/or text message address. Other user activities may be utilized without departing from the spirit or scope of the present disclosure. The tracking module 400 further operates to record an identifier of any external source involved in the transaction (e.g., a financial institution, a retailer, a person, etc.) and to track the successful execution of each activity [S418]. The tracking module 400 further operates to record the financial session end date and end time upon the user ending the financial session, or to record the financial session end date and termination time if the financial session is otherwise terminated [S420].

As noted above, upon successful completion of the first level authentication to the user account [S413:YES], the tracking module 400 operates to determine whether another device is involved in a recent or currently ongoing financial session with the same user account [S415]. If another device is involved in a recent or currently ongoing financial session [S415:YES], the current user device is deemed a secondary device and the current financial session is deemed a secondary financial session. In the instance that a secondary financial session does occur, the risk assessment module 800, described in further detail below, is activated and the user attempting the secondary financial session is prompted for a second level authentication in addition to the first level authentication.

In certain examples, a third level authentication may also be prompted if required in accordance with account owner preferences. Accordingly, the tracking module 400 operates to monitor the type of second level authentication [S426], and whether the second level authentication is successful [S428]. If the second level authentication is successful, [S428:YES], the tracking modules 400 operates to monitor for a third level authentication [S430], if used, and whether it is successful [S432]. If the third level authentication is successful [S432:YES], or is not used, operation of the tracking module moves to [S416] and the subsequent steps described above. If either of the second level authentication [S428:NO] or third level authentication [S442:NO] are not successful, the tracking module 400 terminates operation [S414].

FIG. 5 illustrates an example of an account owner record 500 established within the tracking database 402 having recorded a primary financial session and a secondary financial session for an account owner "A". The account owner record 500 can additionally, or alternatively, be provided as a visual display or user-interactive interface to the user of a device capable of providing such as display, e.g., smart device, computer, or ATM. As shown, the first column 502 of the account owner record/display/interface 500 includes various field identifiers including: (a) "Session ID" 502a—a unique identification that associates an account owner ID with a date and session number; (b) "Detected Device Type" 502b—one of the device categories 410a-410d of FIG. 4B; (c) "Authentication Level I—Type/Access Granted" 502(c)—one of the authentication types 412a-412c of FIG. 4B/access granted to financial account YES or NO; (d) "Authentication Level II—Type/Access Granted" 502d—see authentication type preferences 616a-616e of FIG. 6/access granted to financial account YES or NO; (e) "Authentication Level III—Type/Access Granted"502e—see authentication type preferences 616a-616e of FIG. 6/access granted to financial account YES or NO; (f) "Session Date"502f—month, date and year during which session occurs; (g) "Session Start Time" 502g—time at which session starts, local time zone; (h) "User Activity 1/Time/Amount/External I.D./Successful" 502h—one of user activities 418a-418k of FIG. 4B/time at which user activity is initiated/monetary value involved/identifier of external source (e.g. account outside of present financial institution)/whether user activity is successfully completed, YES or NO; (i) "User Activity 2/Time/Amount/External I.D./Successful" 502i—one of user activities 418a-418k of FIG. 4B/time at which user activity is initiated/monetary value involved/identifier of external source (e.g. account outside of present financial institution)/whether user activity is successfully completed, YES or NO; (j) "User Activity 3/Time/Amount/External I.D./Successful" 502j—one of user activities 418a-418k of FIG. 4B/time at which user activity is initiated/monetary value involved/identifier of external source (e.g. account outside of present financial institution)/whether user activity is successfully completed, YES or NO; (k) "Logout—Session End Time" 502k—time at which the user terminates the session; (l) "Secondary Session? Y/N" 502l—do another, secondary financial banking session occur while the primary session was ongoing? YES or NO; (m) "Secondary Session ID" 502m—the session identification of the secondary session; and (n) "Termination Time" 502n—time session was terminated if terminated by other than the user (e.g., terminated by the financial server).

The second column 504 of the account owner record/display/interface 500 illustrates the data recorded relating to the primary financial session of account owner "A". The recorded data includes a session ID 504a of "A-11-17-16-01" wherein "A" is the account owner identifier, "11-17-16" is the date the primary financial session is initiated, and "01" represents the a session number for the date, e.g., this is the first financial session related to the account of account owner "A". The recorded data further includes the detected device type 504b (e.g., one of the device categories 410a-410d of FIG. 4B) of "Web Browser Device" as well as the first level authentication type (e.g., one of the authentication types 412a-412c of FIG. 4B) of "Username/Password" 504c(i) and an indication that the first level authentication was successful 504c(ii), "Y" for YES. As the present financial session is a primary session only first level authentication is required, accordingly, nothing has been recorded for second or third level authentication 504d, 504e, respectively.

The session date 504f of the primary financial session is noted as Nov. 17, 2016 with the session start time of 13:07 504g. In this primary financial session the user "A" has performed two user activities (selected from user activities 418a-481k of FIG. 4B). The first user activity comprises a monetary transfer between internal user accounts (Monetary Trans—Int. User Acct.) 504h(i), occurring at time 13:10 504h(ii), involving the amount of $800 504h(iii), no external source is involved 504h(iv) and the activity is performed successfully, "Y" for YES, 504h(v).

The second user activity comprises a request for additional checks ("Check Printing Request") 504i(i), occurring at time 13:14 504i(ii), involving the amount of $25 504i(iii), no external source is involved 504i(iv) and the activity is performed successfully, "Y" for YES, 504i(v). The user logs out of the session at time 13:20 504j. The data of the primary financial session additionally indicates that a secondary financial session has occurred while the primary financial session was ongoing, "Y" for YES, 504k and identifies that secondary financial session as "A-11-17-16-02."

The third column 506 of the account owner record/display/interface 500 illustrates the data recorded relating to the secondary financial session of account owner "A". The recorded data includes a session ID 506a of "A-11-17-16-02" wherein "A" is the account owner identifier, "11-17-16" is the date the secondary financial session is initiated, and "02" represents the a session number for the date, e.g., this is the second financial session related to the account of account owner "A". The recorded data further includes the detected device type 506b (e.g. one of the device categories 410a-410d of FIG. 4B) of "Dial-In Device" as well as the first level authentication type (e.g., one of the authentication types 412a-412c of FIG. 4B) of "Telephone No./PIN" 506c(i) and an indication that the first level authentication was successful 506c(ii), "Y" for YES.

Because the presently described financial session is a secondary financial session second level authentication is required, via the risk assessment module 800, and account owner "A" has set a preference, via the account owner preference module 600, to additionally require third level authentication. The type of second and third level authentication used is set as a preference by the account owner (e.g., see authentication type preferences 616a-616e of FIG. 6). In this instance the, account owner has set a preference for second level authentication of "Knowledge" 506d(i) and the authentication has been successfully performed, "Y" for YES 506d(ii). Further, the account owner has set a preference for third level authentication of "E-Mail Message" 506e(i), which has also been successfully performed, "Y" for YES 506e(ii). The date of the secondary session is noted as Nov. 17, 2016 506f with a session start time of 13:11 506g.

In this secondary financial session the user of the secondary device has attempted to perform at least one user activity (see user activities 418a-418k of FIG. 4B). The noted activity includes a monetary transfer with an external account ("Monetary Trans.—External Acct.") 506h(i) occurring at time 13:14 506h(ii) involving the amount of $6000 506h(iii) and an external source identified as the "Bank of Fiji" 506h(iv). The user activity was not successfully completed, "N" for NO 506h(v). Rather the secondary financial session was terminated by the risk assessment module 800 as indicated by the session termination time of 13:15 506n. In this example, the risk assessment module 800 (described in further detail below) found the presence or possibility of fraud in that the user activity involves a transfer of money outside of the account owner's home country (see Fraud Profile 808c of FIG. 8B).

Figure 6:
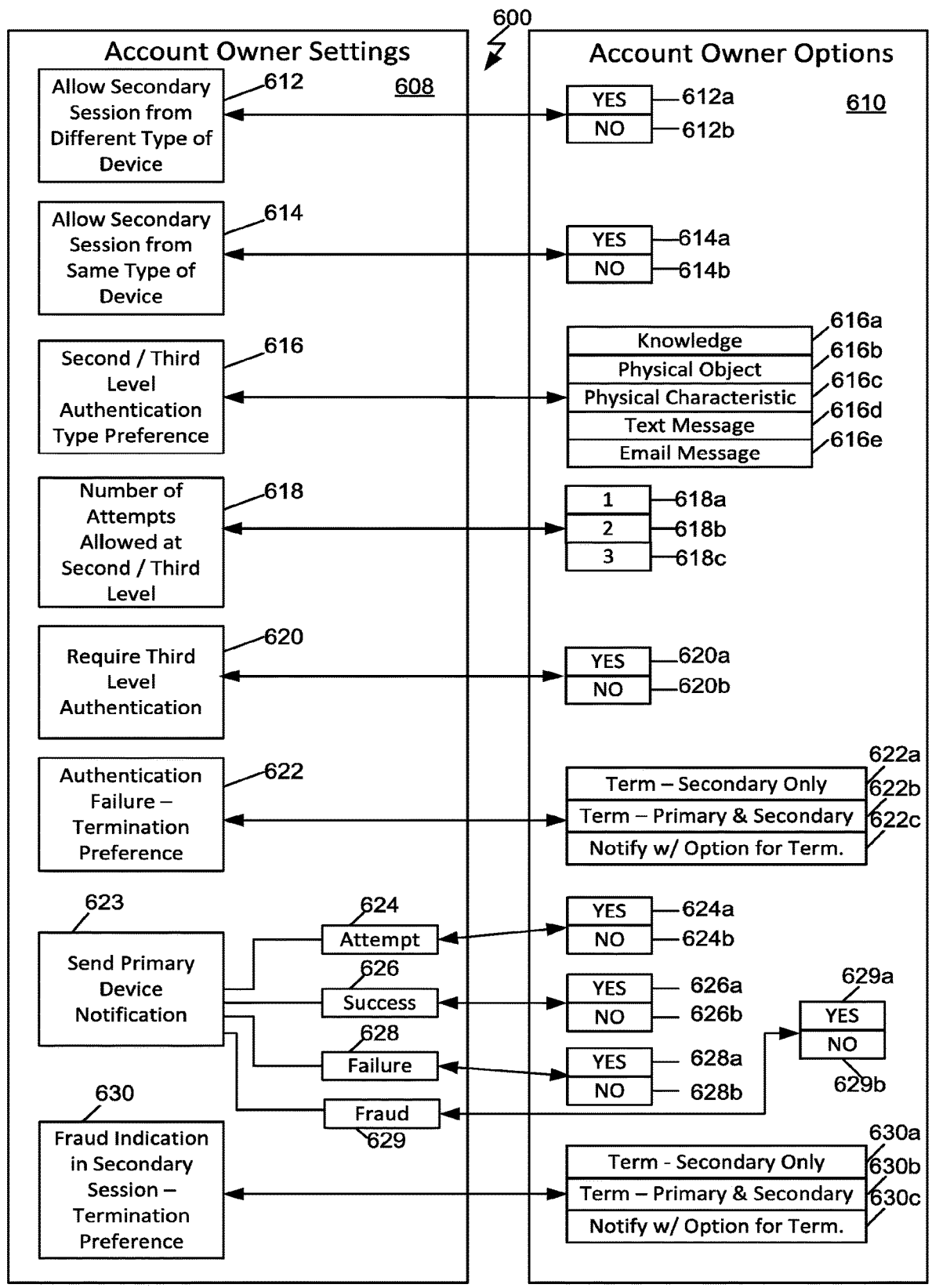
FIG. 6 is a schematic illustration of an example of a graphical user interface for account owner settings of a computing device of the system of FIG. 1.

Referring now to FIG. 6, the account owner preference module 600 provides the account owner settings 608 and account owner options 610 that are used to define the secondary session preferences of the account owner. The account owner settings 608 include a setting 612 to allow a secondary financial session from a type of device that is different from the type of device that has established the original financial session (the categories of device types are found in FIG. 4). The account owner options 610 for this setting are to allow (YES, 612a) or not allow (NO, 612b) the secondary session. The account owner settings 608 further include a setting 614 to allow a secondary financial session from a type of device that is the same type of device that has established the original financial session. The account owner options 610 for this setting are to allow (YES, 614a) or not allow (NO, 614b) the secondary session.

If the account owner intends to allow a secondary session, the risk assessment module 800 (described in further detail below) requires that the user attempting the secondary financial session to not only successfully complete a first level authentication but a second level authentication as well. Accordingly, the account owner settings 608 provide a setting 616 to set a preference for a second level authentication type. The account owner options 610 for second level authentication type can comprises various authentication types, including but not limited to, knowledge authentication 616a, physical object authentication 616b, physical characteristic authentication 616c, text message authentication 616d, and e-mail message authentication 616e. Knowledge authentication 616a requires the user attempting to log into a secondary session to enter a password or PIN.

Physical object authentication 616b requires the user attempting to log into a secondary session to attach to their device, or otherwise provide their device with access to, a physical object such as a USB (universal serial bus) stick with a secret token, financial card/credit card, key, etc. Physical characteristic authentication 616c requires the user attempting to a log into a secondary session to transmit through their device a biometric characteristic such as a fingerprint, eye iris, voice, typing speed, pattern in key press intervals, etc. Text message authentication 616d requires the user attempting to log into a secondary session to enter server-generated code into their device, wherein the code is sent via text, upon the login attempt, to an established account owner text address/number stored in the account owner preference database 602. E-mail message authentication 616e operates similar to text message authentication 616d with server-generated code being sent via e-mail to an established account owner e-mail address.

Upon the account owner establishing a preference for the type of second level authentication, the account owner settings 608 provide a setting 618 to establish a number of attempts that will be allowed for second level authentication. The account owner options 610 provide for a single attempt 618a, two attempts 618b, or three attempts 618c. In certain examples, an additional number of attempts may be included if desired. The account owner settings 608 additionally provide a setting 620 enabling the account owner to require a third level authentication in addition to the second level authentication. The account owner options 610 provide for requiring third level authentication (YES, 620a) or not requiring third level authentication (NO, 620b). If third level authentication is desired by the account owner, the account owner can utilize account owner setting 616 and account owner options 616a-616e to set a third level authentication type preference. Further, the account owner can utilize settings 618 and account owner options 618a-618c to set the number of attempts that will be allowed for third level authentication.

The account owner settings 608 of the account owner preference module 600 additionally provide the account owner with a setting 622 for a session termination preference upon second or third level authentication failure. The account owner options 610 enable the account owner to terminate the secondary session only 622a, terminate both the original and secondary sessions 622b, or send a notice to the account owner at an account owner designated address/device (the address/device can be the same or different than the primary device and its address) with the option for termination of the primary and/or secondary sessions 622c.

The account owner settings 608 further provide a setting 623 enabling the account owner to send a notification (e.g., user interface alert, text alert, e-mail alert) to their primary device, e.g., the device that originated the initial financial session, regarding a secondary financial session. More specifically, the account owner is provided with a setting 624 for primary device notification upon an attempt at a secondary financial session (an attempt occurs upon the secondary device passing first level authentication) with the account owner options providing a YES 624a to send the notification and a NO 624b to not send the notification.

The account owner is further provided with a setting 626 for primary device notification upon successful establishment of a secondary financial (e.g. the second device has passed first, second, and, if desired, third level authentication); account owner options 610 provide for YES 626a or NO 626b. The account owner may also choose to be notified at their primary device of a failure in establishing a secondary financial session via setting 628 (failure occurring upon failure of second or third level authentication); account owner options 610 provide for YES 628a or NO 628b. And finally, the account owner may also choose to be notified at the primary device of a detection of fraud by the risk assessment module via setting 629; account owner options 610 provide for YES 629a or NO 629b.

The account owner settings 608 of the account owner preference module further 600 further provide the account owner with a setting 630 that is beyond mere notification of the detection of fraud. More specifically, setting 630 is provided for the handling fraud detection in a secondary financial session. The account owner options 610 enable the account owner to terminate the secondary financial session 630a, terminate both the primary and secondary financial sessions 630b, or send a notice to the account owner at an account owner designated address/device (the address/device can be the same or different than the primary device and its address) with the option for termination of the primary and/or secondary financial sessions 630c.

Numerous other account owner settings 608 and account owner options 610 can be provided as desired and/or appropriate without departing from the spirit or scope of the disclosure.

FIG. 7 illustrates an example of an account owner record 700 established within the account owner preference database 602 having recorded various account owner secondary financial session preferences such as those described above with reference to FIG. 6. The account owner record 700 can additionally, or alternatively, be provided as a visual display or interactive user interface to the user on a device capable of providing such as display, e.g., smart device, computer, or ATM, with the account owner settings 608 displayed as field identifiers and the account owner options 610 provided as a graphical drop-down, pop-up, or other type of suitable interactive option selection menu.

As shown, the account owner record/display/interface 700 includes a first column 702 including an account owner preference identification label (e.g., field identifier) for each account owner preference including the following labels: (a) "Allow Secondary Session From Different Type of Device" 702a—corresponding to account owner setting 612 and account owner options 612a and 612b, see FIG. 6 and accompanying description above; (b) "Allow Secondary Session from Same Type of Device" 702b—corresponding to account owner setting 614 and account owner options 614a and 614b, see FIG. 6 and accompanying description above; (c) "Second Level Authentication Type Preference" 702c—corresponding to account owner setting 616 and account owner options 616a-616e, see FIG. 6 and accompanying description above; (d) "Number of Attempts Allowed at Second Level Authentication" 702d—corresponding to account owner setting 618 and account owner options 618a-618c, see FIG. 6 and accompanying description above; (e) "Require Additional Third Level Authentication" 702e—corresponding to account owner setting 620 and account owner options 620a and 620b, see FIG. 6 and accompanying description above; (f) "Third Level Authentication Type Preference" 702f—corresponding to account owner setting 616 and account owner options 616a-616e, see FIG. 6 and accompanying description above; (g) "Number of Attempts Allowed at Third Level Authentication" 702g—corresponding to account owner setting 618 and account owner options 618a-618c, see FIG. 6 and accompanying description above; (h) "Failure of Authentication—Termination Preference" 702h—corresponding to account owner setting 622 and account owner options 622a-622c, see FIG. 6 and accompanying description above; (i) "Send Primary Device Notification of Secondary Session Attempt" 702i—corresponding to account owner setting 624 and account owner options 624a and 624b, see FIG. 6 and accompanying description above; (j) "Send Primary Device Notification of Secondary Session Authentication Success" 702j—corresponding to account owner setting 626 and account owner options 626a and 626b, see FIG. 6 and accompanying description above; (k) "Send Primary Device Notification of Secondary Session Authentication Failure" 702k—corresponding to account owner setting 628 and account owner options 628a and 628b, see FIG. 6 and accompanying description above; (l) "Send Primary Device Notification of Secondary Session Fraud Indication" 702l—corresponding to account owner setting 629 and account owner options 629a and 629bm see FIG. 6 and accompanying description above; (m) "Fraud Indication in Secondary Session—Termination Preference" 702m—corresponding to account owner setting 630 and account owner options 630a-630c, see FIG. 6 and accompanying description above. The account owner record/display/interface 700 includes a second column 704 reflecting each of the account owner's preferences 704a-704m from the offered account owner options 610 (see FIG. 6).

Figure 8A:
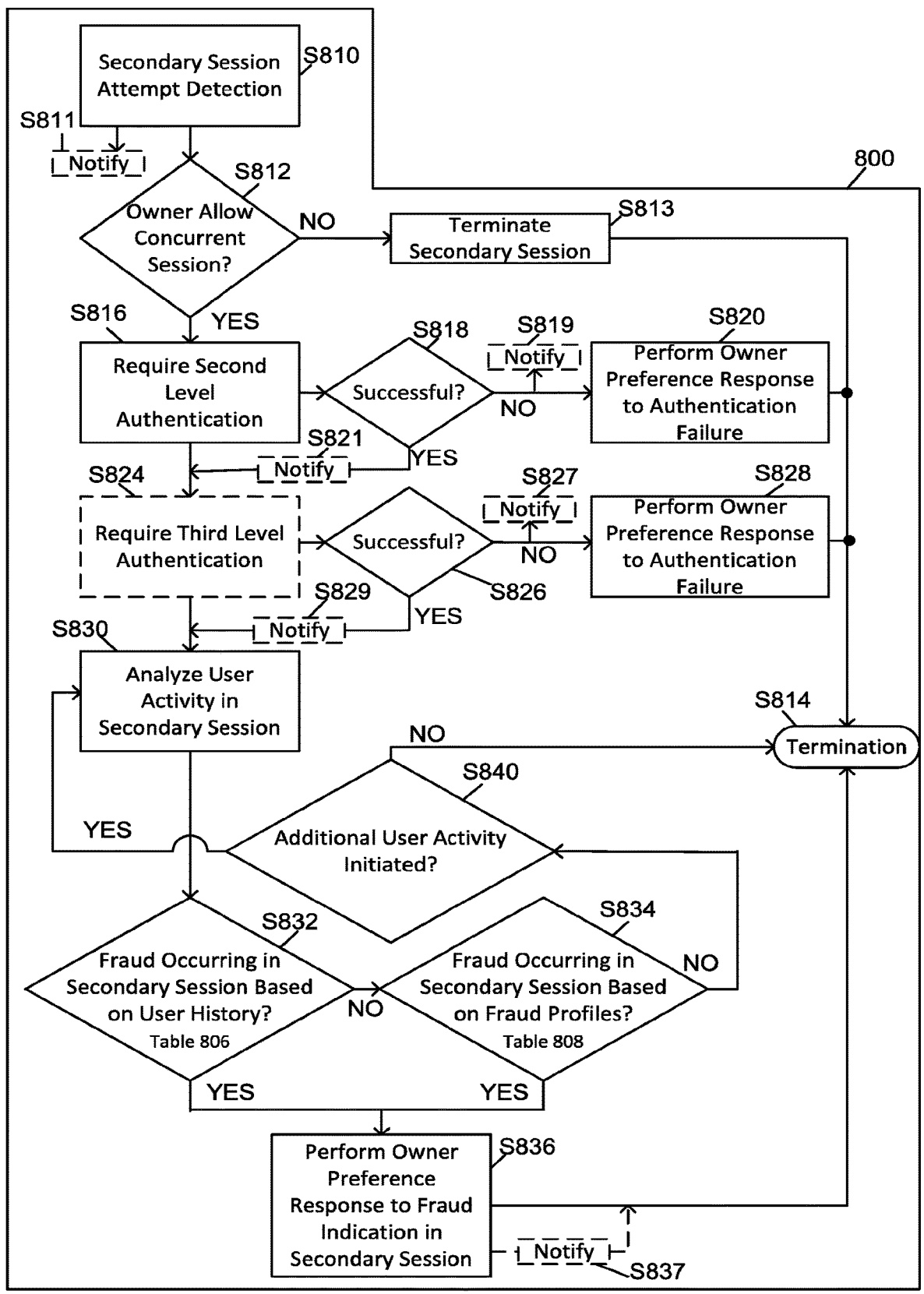
FIG. 8A is a flowchart illustrating an example of the operation of a risk assessment module of the financial institution of FIG. 1.

Referring to FIGS. 8A and 8B, the risk assessment module 800 of the server 10 generally operates, in conjunction with the risk assessment database 802, to analyze user activities within a secondary financial session to determine the presence or possibility of fraud. The risk assessment module is initiated upon detection of an attempt at a secondary financial session [S810]. Detection of the attempt at a secondary financial session occurs upon a user device having a successful first level authentication to a user account that is already in use, e.g., a primary financial session is ongoing.

Upon detection of an attempt at a secondary financial session, the risk assessment module 800 may send notification of the attempt to the account owner at the primary device in accordance with account owner preferences [S811] (see account owner setting 624 of FIG. 6) and checks the account owner preferences associated with the user account to determine if the account owner has agreed to allow a secondary financial session [S812] (see account owner settings 612 and 614 of FIG. 6). If the account owner has not set a preference to allow a secondary financial session from the same or different type of user device as the primary user device [S812:NO], the secondary session is terminated [S813] and the operation of the risk assessment module is terminated [S814].

However, if the account owner has set a preference to allow a secondary financial session [S812:NO] (see account owner settings 612 and 614 of FIG. 6), the risk assessment module 800 operates to prompt the user attempting the secondary financial session to perform a second level authentication [S816] in accordance with account owner preferences for second level authentication type (see setting 616 of FIG. 6). If the second level authentication is not successful after the allotted number of tries [S818:NO] (see account owner setting 618 of FIG. 6), the risk assessment module 800 operates to perform the account owner preference for response to authentication failure [S820] (see account owner setting 622 of FIG. 6), which can include: (a) termination of the secondary financial session; (b) termination of the secondary and primary financial session; or (c) notification to the primary account owner with the option/offer for termination within the notification. A notification of the failure can also be provided to primary device if desired by the account owner [S819] (see account owner setting 628 of FIG. 6).

If the second level authentication is successful [S818:YES], the risk assessment module 800 operates to provide notification of the success at the primary device if desired [S821] (see account owner setting 626 of FIG. 6) and to prompt the user attempting to the secondary financial session to perform a third level authentication [S824] if required by the account owner (see account owner setting 620 of FIG. 6). If third level authentication is required but unsuccessful [S826:NO], the risk assessment module 800 operates to perform the account owner preference for response to authentication failure [S828] (see account owner setting 622 of FIG. 6), which includes the same options as for unsuccessful second level authentication. A notification of the failure can also be provided to primary device if desired by the account owner [S827] (see account owner setting 628 of FIG. 6).

If the second level authentication is successful [S818:YES] and, if third level authentication is not required or is required and successful [S826:YES], the risk assessment module 800 operates to send notification of the success to the primary device if desired by the account owner [S829] (see account owner setting 628 of FIG. 6) and operates to analyze the user activities occurring within the secondary session [S830]. Various types of analysis can be performed, however, the analysis at least includes comparison of secondary financial session parameters (e.g. device type used) and/or activities against fraud profiles 804 stored in the risk assessment database 802. The fraud profiles 804 include those based on the present user account secondary session history [S832] and/or those arrived at through data gathered from a multitude of sources [S834].

FIG. 8B provides just some of the numerous examples of fraud profiles 804 that can be utilized by the risk assessment module 800 for comparison/analysis. Table 806 provides various fraud profiles based on the account history of secondary financial session. These fraud profiles provide comparison points against parameters and/or activities of the current, ongoing secondary financial session and include: (a) whether the present user account has previously been involved in a secondary financial session 806*a*; (b) whether the detected user device type has ever previously been used to initiate a secondary financial session; (c) whether the combination of detected primary device type and detected secondary device type have previously been used together in a secondary financial session 806*c*; (d) whether the current activity has previously been performed in a secondary financial session; (e) whether the number of user activities exceeds the average number of activities (or a user defined maximum number of activities) previously performed; (f) whether monetary transfers have previously occurred between internal and external accounts 806*f*; (g) whether payment into or withdrawal from an external source has occurred previously 806*g*; (h) whether transfers between internal accounts have previously exceeded a set amount 806*h*; (i) whether transfers between internal and external accounts have previously exceeded a set amount 806*i*. In each of these examples, if the answer to the posed profile question is NO, the occurrence or possibility of fraud is deemed indicated, e.g. the user activity is consistent with the fraud profile.

Still referring to FIG. 8B, Table 808 provides various fraud profiles based on data gathered from numerous sources rather than those based on a specific user or user account. These fraud profiles provide comparison points against parameters and/or activities of the current, ongoing secondary financial session and include: (a) whether there is an attempt to change personal account owner information such as a change to the account owner's address, phone number, social security number, account password, e-mail address or text address 808*a*; (b) whether there is an activity involving a large monetary value, which may be defined by the financial institution, 808*b*; (c) whether there is a user activity originating outside of the account owner's home country or involving a monetary transfer outside of the account owner's home country 808*c*; (d) whether the secondary user device type is the same as the primary user device type 808*d*; (e) whether the same activity(ies) are being performed by the secondary and the primary device 808*e*. In each of these examples, if the answer to the posed profile question is YES, the occurrence or possibility of fraud is deemed indicated, e.g. the user activity is consistent with the fraud profile.

Returning to FIG. 8A, if the user activity in the secondary financial session indicates fraud [S832:YES and/or S834:YES], the risk assessment module 800 operates in accordance with the account owner's preference for responding to fraud detection/indication [S836] (see account owner setting 630 in FIG. 6), which can include: (a) termination of the secondary financial session; (b) termination of the secondary and primary financial session; or (c) notification to the account owner at an account owner designated address/device (the address/device can be the same or different than the primary device and its address) with the option for termination within the notification. A notification of the failure can also be provided to primary device if desired by the account owner [S837] (see account owner setting 629 of FIG. 6). Subsequently, operation of the risk assessment module 800 is terminated [S814].

If the user activity in the secondary financial session does not match a fraud profile [S832:NO and S834:NO], the risk assessment module 800 operates to await an additional user activity [S840]. If an additional user activity occurs within the secondary financial session [S840:YES], the risk assessment module operates to analyze the activity [S830] and perform comparisons of the activity against the various fraud profiles [S832] and/or [S834]. With no fraud detected [S832:NO and S834:NO] and no additional user activities, e.g. the user device has ended/logged out of the secondary financial session, [S840:NO], the operation of the risk assessment module 800 is terminated [S814].

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of this disclosure.

What is claimed is:

1. A non-transitory computer-readable medium storing data instructions which, when executed by a processor, cause the processor to:
   receive an access request from a secondary device for a secondary financial session associated with a user account, the user account being associated with a primary financial session with a primary device;
   authenticate the access request for the secondary financial session for the secondary device;
   upon successful authentication of the access request for the secondary financial session for the secondary device, analyze user activities occurring within the secondary financial session for a determination of fraud; and
   upon the determination of fraud, initiate termination of the secondary financial session per account settings selected by the user, the account settings including to present an option to the user to terminate one or both of the first financial session and the second financial session.

2. The non-transitory computer-readable medium of claim 1, wherein the determination of fraud is based on comparisons of the user activities occurring within the secondary financial session against user history information and fraud profiles.

3. The non-transitory computer-readable medium of claim 1, wherein the data instructions, when executed by the processor, further cause the processor to detect a type of the secondary device attempting to access the user account.

4. The non-transitory computer readable medium of claim 3, wherein the data instructions, when executed by the processor, further cause the processor to raise a level of authentication required to secondarily access the user account beyond that which was required to access the user account for the primary financial session with the primary device.

5. The non-transitory computer-readable medium of claim 4, wherein the user account is associated with a plurality of account settings and wherein the raised level of authentication comprises a first level of authentication set by the type of secondary device detected and a second level of authentication having an authentication type set by one or more of the plurality of account settings associated with the user account.

6. The non-transitory computer-readable medium of claim 5, wherein the raised level of authentication further comprises a third level of authentication required by one or more of the plurality of account settings and having an authentication type set by one or more of the plurality of account settings.

7. The non-transitory computer-readable medium of claim 6, wherein the second and third level authentication are selectable from knowledge authentication, physical object authentication, physical characteristic authentication, text message authentication or e-mail message authentication.

8. The non-transitory computer-readable medium of claim 7, wherein a number of attempts at second level and third level authentication are set by one or more of the plurality of account settings.

9. The non-transitory computer-readable medium of claim 1, wherein the data instructions, when executed by the processor, further cause the processor to:
   upon successful authentication at the raised level is achieved, permit secondary access to the user account.

10. A system, comprising:
    a processor;
    a non-transitory computer-readable medium storing data instructions which, when executed by the processor, cause the processor to:
    receive an access request from a secondary device for a secondary financial session associated with a user account, the user account being associated with a primary financial session with a primary device;
    authenticate the access request for the secondary financial session for the secondary device;
    upon successful authentication of the access request for the secondary financial session for the secondary device, analyze user activities occurring within the secondary financial session for a determination of fraud; and
    upon the determination of fraud, initiate termination of the secondary financial session per account settings selected by the user, the account settings including to present an option to the user to terminate one or both of the first financial session and the second financial session.

11. The system of claim 10, wherein the determination of fraud is based on comparisons of the user activities occurring within the secondary financial session against user history information and fraud profiles.

12. The system of claim 10, wherein the data instructions, when executed by the processor, further cause the processor to: send notification to the primary device of an attempt at secondary access, successful authentication of the secondary access request, or failure of authentication of the secondary access request.

13. The system of claim 10, wherein the data instructions, when executed by the processor, further cause the processor to: raise a level of authentication required to secondarily access the user account beyond that which was required to access the user account for the primary financial session with the primary device.

14. The system of claim 13, wherein the user account is associated with a plurality of account settings and wherein the raised level of authentication comprises a first level of authentication set by the type of secondary device detected and a second level of authentication having an authentication type set by one or more of the plurality of account settings associated with the user account.

15. The system of claim 14 wherein the raised level of authentication further comprises a third level of authentication required by one or more of the plurality of account settings and having an authentication type set by one or more of the plurality of account settings.

16. The system of claim 15, wherein the second and third level authentication are selectable from knowledge authentication, physical object authentication, physical characteristic authentication, text message authentication or e-mail message authentication.

17. The system of claim 16, wherein a number of attempts at second level and third level authentication are set by one or more of the plurality of account settings.

18. The system of claim 10, further including a display device communicatively coupled to the processor, wherein the display device is configured to display both data associated with the primary financial session and data associated with secondary financial session including: session history, device type, authentication type and status of authentication.

19. A method, comprising:
receiving an access request from a device for a secondary financial session associated with a user account, the user account being associated with a primary financial session with a primary device;
authenticating the access request for the secondary financial session for the secondary device;
upon successful authentication of the access request for the secondary financial session for the secondary device, analyzing user activities occurring within the secondary financial session for a determination of fraud; and
upon the determination of fraud, initiating termination of the secondary financial session per account settings selected by the user, the account settings including to present an option to the user to terminate one or both of the first financial session and the second financial session.

20. The method of claim 19, wherein the determination of fraud is based on comparisons of the user activities occurring within the secondary financial session against user history information and fraud profiles.

* * * * *